(12) United States Patent
Chamberlin et al.

(10) Patent No.: US 8,531,147 B2
(45) Date of Patent: Sep. 10, 2013

(54) ELECTRIC MACHINE HAVING AN INTEGRATED VIBRATION SENSOR

(75) Inventors: Bradley D. Chamberlin, Pendleton, IN (US); David A. Fulton, Anderson, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 328 days.

(21) Appl. No.: 13/007,199

(22) Filed: Jan. 14, 2011

(65) Prior Publication Data

US 2012/0181965 A1 Jul. 19, 2012

(51) Int. Cl.
*H02K 11/00* (2006.01)
*D06F 37/20* (2006.01)

(52) U.S. Cl.
CPC .................................... *D06F 37/203* (2013.01)
USPC ........... 318/460; 318/461; 318/462; 318/463; 318/464; 318/465

(58) Field of Classification Search
CPC ..................................................... D06F 37/203
USPC ................................................... 318/460–465
See application file for complete search history.

(56) References Cited

U.S. PATENT DOCUMENTS

| | | | | | |
|---|---|---|---|---|---|
| 4,967,359 | A | * | 10/1990 | Sugasawa et al. | 701/37 |
| 6,138,078 | A | * | 10/2000 | Canada et al. | 702/44 |
| 6,297,742 | B1 | * | 10/2001 | Canada et al. | 340/635 |
| 7,126,243 | B2 | * | 10/2006 | Kawasaki | 310/90.5 |
| 7,821,220 | B2 | * | 10/2010 | El-Ibiary | 318/600 |

* cited by examiner

*Primary Examiner* — Bentsu Ro
*Assistant Examiner* — David Luo
(74) *Attorney, Agent, or Firm* — Cantor Colburn LLP

(57) ABSTRACT

An electric machine including a housing, a stator mounted within the housing, a rotor rotatably mounted within the housing relative to the stator, and a vibration sensor arranged within the housing. The vibration sensor includes a sensing member configured and disposed to detect vibrations of the electric machine.

12 Claims, 1 Drawing Sheet

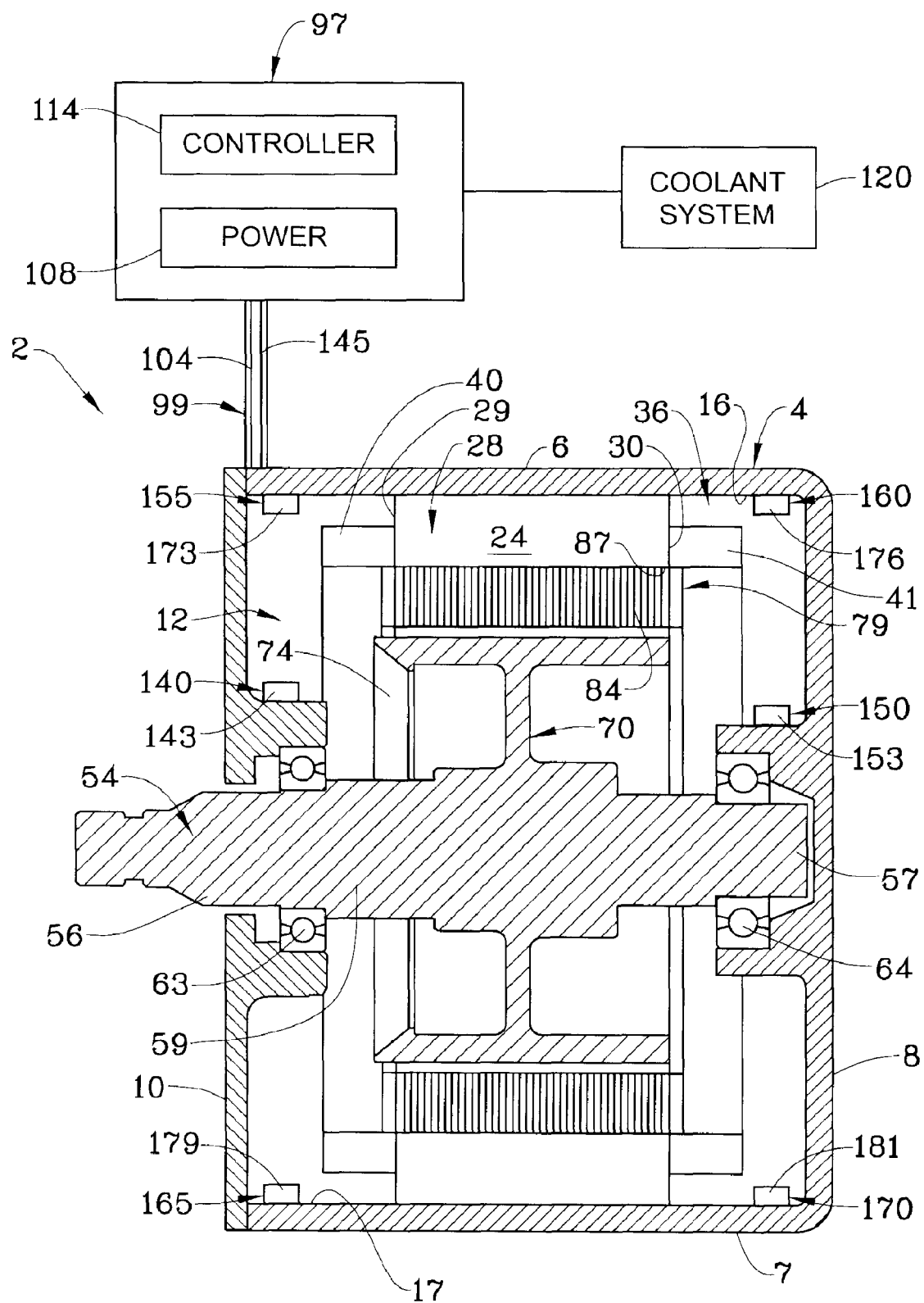

ELECTRIC MACHINE HAVING AN INTEGRATED VIBRATION SENSOR

BACKGROUND OF THE INVENTION

Exemplary embodiments pertain to the art of electric machines and, more particularly, to an electric machine having an integrated vibration sensor.

Electric machines produce work from electrical energy passing through a stator to induce an electro-motive force in a rotor. The electro-motive force creates a rotational force at the rotor. The rotation of the rotor is used to power various external devices. Of course, electric machines can also be employed to produce electricity from a work input. In either case, electric machines are currently producing greater outputs at higher speeds and are being designed in smaller packages. The higher power densities and speeds often result in harsh operating conditions such as high internal temperatures, vibration and the like. Accordingly, many conventional electric machines include sensors that monitor, for example stator temperature, housing temperature, vibration, and the like. The sensors typically take the form of external sensors that are mounted to a housing of the electric machine. The sensors include a separate wiring harness that is coupled to, for example, a controller that reads and/or records sensed data.

BRIEF DESCRIPTION OF THE INVENTION

Disclosed is an electric machine including a housing, a stator mounted within the housing, a rotor rotatably mounted within the housing relative to the stator, and a vibration sensor arranged within the housing. The vibration sensor includes a sensing member configured and disposed to detect vibrations of the electric machine.

Also disclosed is a method of operating an electric machine, the method includes rotating a rotor relative to a stator within a housing, sensing internal vibrations of the electric machine through a vibration sensor mounted within the housing, and adjusting an operating parameter of the electric machine based on the internal vibrations.

BRIEF DESCRIPTION OF THE DRAWINGS

The following descriptions should not be considered limiting in any way. With reference to the accompanying drawings, like elements are numbered alike:

The FIGURE is a cross-sectional side view of an electric machine including an integrated vibration sensor in accordance with an exemplary embodiment.

DETAILED DESCRIPTION OF THE INVENTION

A detailed description of one or more embodiments of the disclosed apparatus and method are presented herein by way of exemplification and not limitation with reference to the Figures.

Exemplary embodiments provide a vibration sensor that is integrated directly into an electric machine. The term "integrated into the electric machine" should be understood to include one or more sensors arranged within and/or formed into external portions of a machine housing. The vibration sensor is positioned within the electric machine and senses vibration produced during operation of the electric machine. Monitoring vibration enhances machine reliability by providing an indicator of a need for adjusting operating parameters. That is, operating parameters of the electric machine can be adjusted to alleviate unwanted vibration levels and or detect a need for repair. Vibration sensors can be positioned to monitor relative machine motion (modes) to ensure that the electric machine is not operating outside desired parameters, which may lead to damage. If excessive vibration is sensed, operating parameters, e.g., speed, load, etc, may be adjusted to adjust vibration to more acceptable levels.

An electric machine in accordance with an exemplary embodiment is indicated generally at 2 in the FIGURE. Electric machine 2 includes a housing 4 having first and second side walls 6 and 7 that are joined by a first end wall 8 and a second end wall or cover 10 to collectively define an interior portion 12. First side wall 6 includes an inner surface 16 and second side wall 7 includes an inner surface 17. At this point it should be understood that housing 4 could also be constructed to include a single side wall having a continuous inner surface. Electric machine 2 is further shown to include a stator 24 arranged at inner surfaces 16 and 17 of first and second side walls 6 and 7. Stator 24 includes a body 28, having a first end portion 29 that extends to a second end portion 30, which supports a plurality of windings 36. Windings 36 include a first end turn portion 40 and a second end turn portion 41.

Electric machine 2 is also shown to include a shaft 54 rotatably supported within housing 4. Shaft 54 includes a first end 56 that extends to a second end 57 through an intermediate portion 59. First end 56 is rotatably supported relative to second end wall 10 through a first bearing 63 and second end 57 is rotatably supported relative to first end wall 8 through a second bearing 64. Shaft 54 supports a rotor 70 that is rotatably mounted within housing 4. Rotor 70 includes a hub 74 that is fixed relative to intermediate portion 59, and a rotor lamination assembly 79. Rotor lamination assembly 79 includes a plurality of laminations, one of which is indicated at 84. Laminations 84 are stacked and aligned to define an outer diametric surface 87 of rotor lamination assembly 79.

Electric machine 2 is electrically connected to a motor control panel 97 through a wire harness 99. Wire harness 99 includes a plurality of power conductors, one of which is indicated at 104, which electrically couple stator 24 with a power source 108 having terminals (not shown) arranged in motor control panel 97. Motor control panel 97 also houses a controller 114 that may be employed to control motor starting, motor speed, and/or motor shut down, as well as setting various other operating parameters of electric machine 2.

In the exemplary embodiment shown, controller 114 is linked to a vibration sensor 140 arranged within housing 4. Vibration sensor 140 can be an accelerometer, a strain gauge or other vibration sensing device. As shown, vibration sensor 140 includes a sensing member 143 that is electrically connected to controller 114 through a sensing line 145 that forms part of wire harness 99. In accordance with one aspect of the exemplary embodiment, vibration sensor 140 is mounted at first bearing 63. An additional vibration sensor 150 having a sensing member 153 is positioned at second bearing 64. In addition to sensors 140 and 150 arranged at first and second bearing 63 and 64, electric machine 2 includes vibration sensors mounted to housing 4. More specifically, electric machine 2 includes vibration sensors 155 and 160 arranged on side wall 6, and vibrations sensors 165 and 170 arranged in side wall 7. Vibrations sensors 150, 155, 160, 165, and 170 each include corresponding sensing members 173, 176, 179, and 181 that are electrically connected to controller 114 through sense lines (not shown) that pass through cable 99.

With this arrangement, controller 114 monitors vibrations produced by electric machine 2. Through vibration sensors 140, 150, 155, 160, 165, and 170, controller 114 monitors relative machine motion (modes) to ensure that electric machine 2 is not operating outside desired parameters, which may lead to damage. In the event that sensed vibrations exceed predetermined levels, controller 114 will adjust operating parameters of electric machine 2. For example, if vibrations levels exceed the predetermined level, controller 114 may reduce rotational speed of shaft 54 or adjust gearing or clutches to alter a load on electric machine 2 until vibration levels return to acceptable levels.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
   a housing;
   a stator mounted within the housing;
   a rotor rotatably mounted within the housing relative to the stator;
   a plurality of vibration sensors integrated into the housing at multiple positions, each of the plurality of vibration sensors including a sensing member configured and disposed to detect vibrations of the electric machine; and
   a controller operatively connected to each of the plurality of sensors, the controller being configured and disposed to determine a relative motion of the electric machine based on the vibrations sensed at the plurality of vibration sensors.

2. The electric machine according to claim 1, further comprising: a shaft mounted within the housing, the shaft having a first end that extends to a second end through an intermediate portion, at least one of the plurality of vibration sensors being mounted at one of the first and second ends of the shaft.

3. The electric machine according to claim 2, further comprising: a first bearing mounted at the first end of the shaft and a second bearing mounted at the second end of the shaft, at least one of the plurality of vibration sensors being mounted adjacent the corresponding one of the first and second bearings.

4. The electric machine according to claim 2, further comprising: another one of the plurality of vibration sensors mounted at another of the first and second ends of the shaft.

5. The electric machine according to claim 2, further comprising: another one of the plurality of vibration sensors mounted to an internal surface of the housing.

6. The electric machine according to claim 5, wherein the another one of the plurality of vibration sensors comprises a plurality of vibration sensors mounted to an internal surface of the housing.

7. The electric machine according to claim 1, further comprising: a motor control panel including a power source, the electric machine being electrically connected to the motor control panel through a cable, the cable including a power conductor that electrically connects the stator and the power source and a sensing line that electrically connects the vibration sensor and the controller.

8. The electric machine according to claim 1, wherein the vibration sensor is one of an accelerometer and a strain gauge.

9. A method of operating an electric machine, the method comprising:
   rotating a rotor relative to a stator within a housing;
   sensing internal vibrations of the electric machine through multiple vibration sensors mounted at multiple positions within the housing;
   determining a relative motion of the electric machine based on the internal vibrations at multiple positions; and
   adjusting an operating parameter of the electric machine based on the internal vibrations.

10. The method of claim 9, wherein,
    adjusting the operating parameter of the electric machine includes adjusting the operating parameter based on the relative motion.

11. The method of claim 9, wherein adjusting an operating parameter of the electric machine comprises changing a rotational speed of the rotor.

12. The method of claim 9, wherein adjusting an operational parameter of the electric machine comprises changing an operational load associated with the electric machine.

* * * * *